(12) United States Patent
Jersenius et al.

(10) Patent No.: US 8,675,492 B2
(45) Date of Patent: Mar. 18, 2014

(54) METHOD AND ARRANGEMENT FOR LOAD BALANCING IN A TELECOMMUNICATIONS SYSTEM

(75) Inventors: Kristina Jersenius, Linköping (SE); Erik Eriksson, Linköping (SE); Kristofer Sandlund, Luleå (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 63 days.

(21) Appl. No.: 13/575,082

(22) PCT Filed: Feb. 1, 2010

(86) PCT No.: PCT/SE2010/050103
§ 371 (c)(1),
(2), (4) Date: Jul. 31, 2012

(87) PCT Pub. No.: WO2011/093758
PCT Pub. Date: Aug. 4, 2011

(65) Prior Publication Data
US 2012/0300635 A1 Nov. 29, 2012

(51) Int. Cl.
*H04L 1/18* (2006.01)
(52) U.S. Cl.
USPC .......................................................... 370/235
(58) Field of Classification Search
USPC ................................. 370/232, 233, 234, 235
See application file for complete search history.

(56) References Cited

U.S. PATENT DOCUMENTS 8,358,621 B2 * 1/2013 Fan et al. ....................... 370/329
8,488,549 B2 * 7/2013 Yang et al. .................... 370/329

(Continued)

FOREIGN PATENT DOCUMENTS

WO 2008115134 A1 9/2008
WO 2009044344 A2 4/2009

OTHER PUBLICATIONS

3rd Generation Partnership Project. 3GPP Technical Specification Group Radio Access Network; Evolved Universal Terrestrial Radio Access (E-UTRA) and Evolved Universal Terrestrial Radio Access Network (E-UTRAN); Overall description; Stage 2 (Release 9). Dec. 2012.

(Continued)

*Primary Examiner* — Omar Ghowrwal
*Assistant Examiner* — Peter Solinsky
(74) *Attorney, Agent, or Firm* — Murphy, Bilak & Homiller, PLLC

(57) ABSTRACT

The present invention relates to a method and a base station (14, 700) for load balancing in Semi-Persistent Scheduling, SPS transmission. The method can comprise to activate downlink or uplink SPS transmission for a User Equipment (12, step 204), and to obtain information about transmission load comprising SPS transmission or HARQ ACK/NACK responses to SPS transmissions, on a Physical Shared or Control Channel (steps 206; 402; 406; 502, 504, 508, 510). Based on the obtained information it is determined for which subframe within a duration of T subframes, the transmission load comprising SPS transmission or HARQ ACK/NACK response to SPS transmissions, on a Physical Shared Channel or on a Physical Control Channel is the lowest within the duration of T subframes (steps 208; 404; 408; 506, 512, 514). SPS transmission is then scheduled to be valid in the determined subframe having the lowest SPS transmission load on the Physical Shared Channel or to be valid in a subframe causing the HARQ ACK/NACK responses to the SPS transmissions to be transmitted in the subframe having the lowest of HARQ ACK/NACK responses to the SPS transmissions, within the duration of T subframes (step 210). This load balancing provides a number of advantages comprising less postponed scheduling, less unused subframes and less collisions on said channels.

16 Claims, 6 Drawing Sheets

(56) References Cited

U.S. PATENT DOCUMENTS

| | | | |
|---|---|---|---|
| 8,555,126 B2* | 10/2013 | Lohr et al. | 714/748 |
| 2010/0074200 A1* | 3/2010 | Li et al. | 370/329 |
| 2010/0111026 A1* | 5/2010 | Hsu | 370/329 |
| 2011/0116454 A1* | 5/2011 | Chen et al. | 370/329 |
| 2011/0243066 A1* | 10/2011 | Nayeb Nazar et al. | 370/328 |

OTHER PUBLICATIONS

Nokia. "Uplink Scheduling for VoIP." 3rd Generation Partnership Project. 3GPP TSG-RAN WG2 Meeting #57. R2-070476. Feb. 16, 2007. St. Louis, Missouri.

* cited by examiner

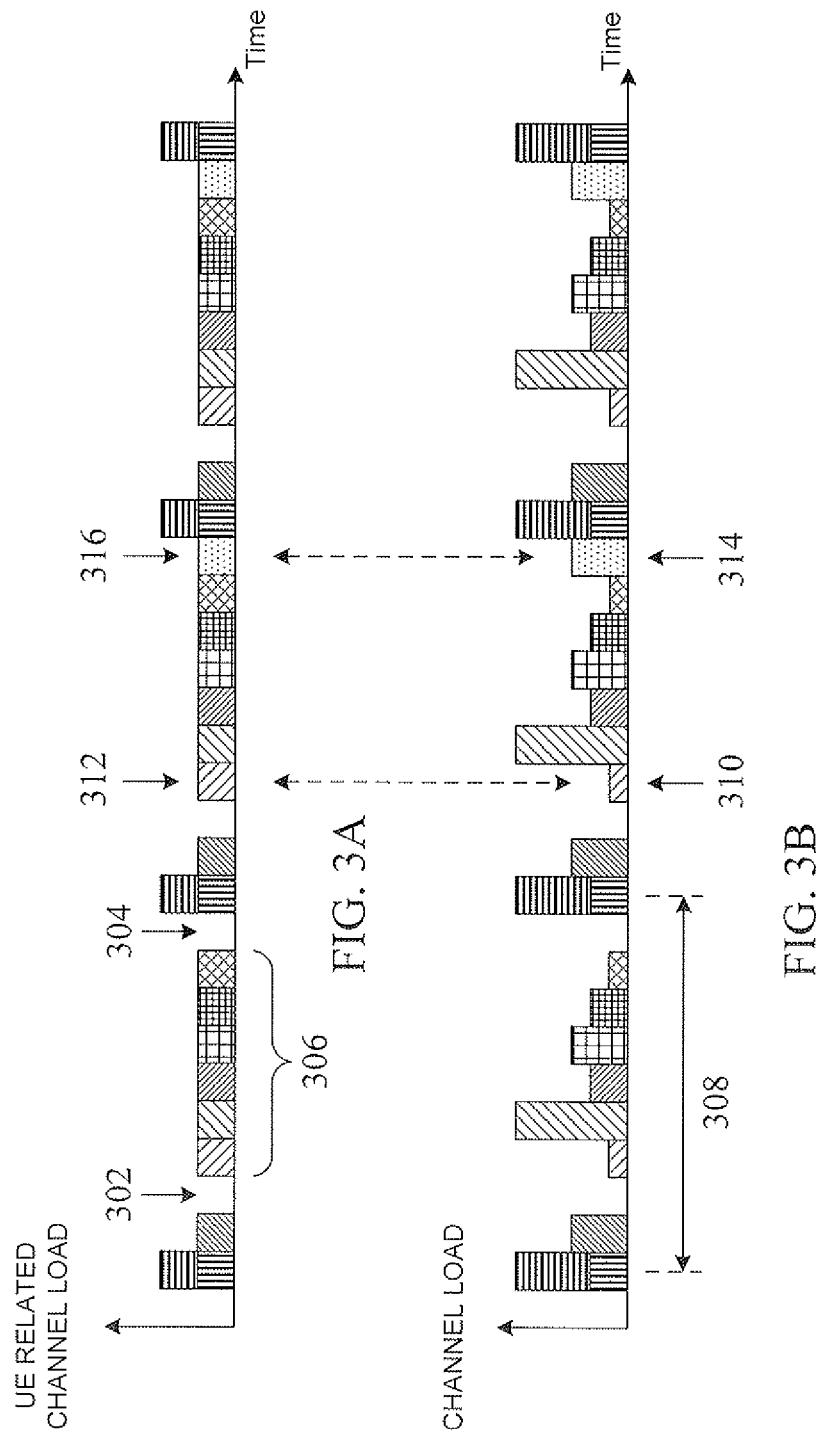

METHOD AND ARRANGEMENT FOR LOAD BALANCING IN A TELECOMMUNICATIONS SYSTEM

TECHNICAL FIELD

The present invention relates to a method and arrangement in a telecommunications system, in particular it relates to a method and an arrangement for load balancing for semi-persistent scheduling in a telecommunications system.

BACKGROUND

In Long Term Evolution (LTE) it is possible for an eNodeB to dynamically schedule User Equipments (UEs) in downlink and uplink by transmitting downlink scheduling assignments and uplink scheduling grants on the Physical Downlink Control CHannel (PDCCH) on 1 ms basis.

For uplink transmission a UE that has data to transmit but has not been given any uplink grant can indicate to its serving eNodeB that it would like to transmit data by sending a scheduling request on the Physical Uplink Control CHannel (PUCCH).

For downlink transmission, scheduled data is transmitted on the Physical Downlink Shared CHannel (PDSCH) in the same subframe, which is 1 ms long in time, in which the downlink assignment is transmitted on PDCCH.

The UE can then transmit a Hybrid Automatic Repeat reQuest (HARQ) ACKnowledgement (ACK) or Negative ACKnowledgement (NACK) response on PUCCH, based on whether the UE received data successfully on PDSCH.

For dynamic scheduling, the resource on PUCCH to be used for the ACK/NACK response is given by the PDCCH resource on which the downlink assignment is transmitted.

There is a requirement of a low load for PUCCH, based on studies that have shown that the usage of the available PUCCH resources should be kept around 20%. In the uplink, the UE transmits on the Physical Uplink Shared CHannel (PUSCH) a certain number of subframes after having received an uplink grant. The eNodeB transmits the HARQ ACK/NACK response on the Physical HARQ Indicator CHannel (PHICH). The resource for the ACK/NACK response is given by the PUSCH resource allocation and the demodulation reference signal cyclic shift.

In the uplink the HARQ is synchronous, which means that it is known to the UE in which subframe to transmit a retransmission. If the UE does not receive a grant from the eNodeB for a retransmission, the retransmission will be transmitted on the same resources in frequency as for the previous transmission attempt. If a grant is received, the retransmission is done on the frequency resources which are indicated in the new grant. It is possible for the eNodeB to cancel a synchronous HARQ retransmission by transmitting an ACK on PHICH. The available PDCCH resources for grant or assignment signaling are limited, and so are the PUCCH resources for scheduling request signaling.

In order to limit the grant or assignment signaling needed, as well as the scheduling request, a concept called Semi-Persistent Scheduling (SPS) has been introduced in LTE. In semi-persistent scheduling an assignment or grant is valid with a certain periodicity which is configured by higher-layer signaling, Radio Resource Control (RRC).

For downlink SPS are the PUCCH resources that the UE can use for HARQ ACK/NACK responses also RRC configured. The semi-persistent scheduling can be initiated by sending a grant or assignment with a special Cell Radio Network Temporary Identifier (C-RNTI). In downlink, the initial assignment contains information about which one of the 4 RRC configured HARQ ACK/NACK resources that should be used. SPS can be deactivated by sending a grant/assignment with special C-RNTI.

It is up to the eNodeB scheduler to decide when to transmit the initial grant or assignment. The straight forward solution for when to do this is to do it as soon as 1) there is an indication of that there is data to transmit for the service for which SPS has been configured and 2) there are available resources on PDCCH to transmit the assignment/grant and 3) available resources on PDSCH or on PUSCH to transmit the data.

Within the existing solution for when to transmit the initial grant/assignment the SPS transmissions might become unevenly distributed over time. In subframes with a lot of SPS transmissions there might be few or no PDSCH resources in case of downlink SPS or few or no PUSCH resources in case of uplink SPS for dynamically scheduled data. Having subframes with high SPS load also means that there are subframes with a lot of HARQ ACK/NACK responses to the SPS transmissions on PUCCH in case of downlink SPS or on PHICH in case of uplink SPS. Moreover, having subframes with high SPS load also means that there are subframes with a lot of HARQ ACK/NACK responses to the SPS transmissions on PHICH in case of uplink SPS.

There are thus subframes having a high load on PUCCH unless the number of users which can be scheduled in downlink dynamically in the same subframe is limited, considering the 20% load requirement on PUCCH.

Similarly, there can be subframes having a high load on PHICH unless the number of users which can be scheduled in uplink dynamically in the same subframe is limited.

One alternative way to solve the PUCCH high load problem is to over-dimension the PUCCH. The PHICH load problem may be solved by dimensioning the PHICH such that the number of PUSCH resources is always more limiting than the number of PHICH resources. However, as a consequence to over-dimensioning the PUCCH resources, the overhead is increased.

Potential problems with prior art techniques are:
Scheduling of other data has to be postponed which is bad for data with high delay requirements,
High PUCCH load or high PUCCH overhead,
High PHICH load,
Waste of PDCCH resources, since there are unused PDCCH resources in the subframes with SPS transmissions occupying a lot of the PDSCH or PUSCH resources,
Interference variations in time, and
Synchronous HARQ retransmission and SPS transmission collisions in uplink which have to be resolved by sending grants to deactivate SPS or move SPS transmissions in frequency, or grants to move the HARQ retransmissions in frequency or ACKs on PHICH to cancel the HARQ retransmission.

There is thus a need for an improved method and arrangement of load management for eliviating at least some of the potential problems above.

SUMMARY

It is an object of the present invention to provide load management within Semi-Persistent Scheduling (SPS), such that at least some of the potential problems previously noted herein can be alleviated.

This object is achieved in one or more embodiments by providing load balancing within SPS, such that SPS is valid in subframes having a low channel load.

According to an aspect of the present invention, there is provided a method in a base station for load balancing within Semi-Persistent Scheduling, SPS, comprising activating downlink or uplink SPS transmission for a User Equipment, UE for a subframe, and obtaining information about SPS transmission load on a Physical Shared Channel or transmission load related to SPS transmissions on a Physical Shared Channel, on a Physical Control Channel. Also, the method comprises determining for which subsequent subframe within a duration of T subframes, the SPS transmission load on the Physical Shared Channel or the transmission load related to Physical Shared Channel SPS transmissions, on the Physical Control Channel is the lowest among the subframes within the duration of T subframes, and scheduling SPS transmissions on a Physical Shared Channel to be valid in the determined subframe having the lowest SPS transmission load in the case the SPS transmission load on the Physical Shared Channel is the lowest among the subframes within the duration of T subframes, or scheduling SPS transmission on a Physical Shared Channel to be valid in a subframe determined such that a Hybrid Automatic Repeat reQuest, HARQ ACK/NACK response to SPS transmission on the Physical Shared Channel is transmitted on the Physical Control Channel in the determined subframe, within the duration of T subframes.

The step of obtaining information may further comprise obtaining the amount of resources occupied for SPS transmission on Physical Uplink Shared Channel, PUSCH or on Physical Downlink Shared Channel, PDSCH.

The step of determining may further comprise determining for which subsequent subframe within a duration of T subframes, the SPS transmission load on Physical Uplink Shared Channel, PUSCH or on Physical Downlink Shared Channel, PDSCH is the lowest among the subframes within the duration on T subframes. The step of scheduling transmissions may further comprise scheduling transmissions on Physical Uplink Shared Channel, PUSCH or on Physical Downlink Shared Channel, PDSCH to be valid in the determined subframe having the lowest SPS transmission load, among the subframes within the duration of T subframes.

The step of obtaining information may comprise obtaining the number of UEs with SPS transmissions on a Physical Shared Channel.

The step of obtaining information may further comprise obtaining the number of resources on Physical Harq Indicator Channel, PHICH, or on Physical Uplink Control Channel, PUCCH occupied for HARQ ACK/NACK responses to SPS transmissions on a Physical Shared Channel.

The step of determining may further comprise determining for which subsequent subframe within a duration of T subframes, the HARQ ACK/NACK response to SPS transmission load on a Physical Shared Channel, on PHICH or PUCCH is the lowest among the subframes within the duration on T subframes, and wherein the step of scheduling transmissions comprises scheduling transmissions on Physical Uplink Shared Channel, PUSCH or on Physical Downlink Shared Channel, PDSCH to be valid in a subframe that makes the HARQ ACK/NACK response to the SPS transmission on the Physical Shared Channel, to be transmitted on PHICH or PUCCH in the subframe having the lowest load on PHICH or PUCCH, respectively, among the subframes within the duration of T subframes.

The step of obtaining information may comprise obtaining the number of UEs with SPS transmission on a Physical Shared Channel.

The step of determining may further comprise determining a percentage R of used PDSCH or PUSCH resources out of a totally available PDSCH or PUSCH resources for each subframe within a duration of T subframes, and a percentage C of used Physical Harq Indicator Channel, PHICH resources out of a totally available PHICH resources, or the percentage of used Physical Uplink Control Channel, PUCCH resources out of a number of supported PUCCH resources, and determining for which subframe the maximum of R and C per subframe has a minimum among the subframes within the duration of T subframes.

The step of scheduling transmission may further comprise scheduling SPS transmission on PDSCH or PUSCH to be valid in the determined subframe, having the minimum among the subframes within a duration of T subframes, of the maximum of R and C per subframe.

The step of determining may further comprise determining the subframe, having the lowest number of UEs with SPS transmission or the lowest number of used PDSCH or PUSCH resources, among the subframes within a duration of T subframes, further comprises determining whether the number of UEs with SPS transmission is below an upper limit of number of UEs, in case the subframe having the lowest number of used PDSCH or PUSCH resources, among the subframes within a duration of T subframes, is used, or determining whether the number of used PDSCH or PUSCH resources is below an upper limit of PDCSH or PUSCH resources, in case the subframe having the lowest number of UEs, among the subframes within a duration of T subframes, is used, according to some criterion.

The step of determining may further comprise determining a subsequent subframe among the subframes within a duration of T subframes, having the second lowest number of UEs with SPS transmission or the second lowest number of used PDSCH or PUSCH resources for SPS transmission, in the case the determined number of UEs with SPS transmission is above an upper limit of UEs with SPS transmission when the subframe having the lowest number of used PDSCH or PUSCH resources, among the subframes within a duration of T subframes, is used, or in case the number of used PDSCH or PUSCH resources is above the upper limit of used PDSCH or PUCSH resources, when the subframe having the lowest number of UEs with SPS transmission, among the subframes within a duration of T subframes, is used, further comprising determining whether the number of UEs with SPS transmission is below an upper limit of number of UEs, in case the subframe having the second lowest number of used PDSCH or PUSCH resources, among the subframes within a duration of T subframes, is used, or determining whether the number of used PDSCH or PUCSH resources is below an upper limit of PDSCH or PUSCH resources, in case the subframe having the second lowest number of UEs, among the subframes within a duration of T subframes, is used.

The step of scheduling transmission may further comprises scheduling transmission on PDSCH or PUSCH to be valid in the subframe having the second lowest transmission load, among the subframes within the duration of T subframes.

The method may further comprise transmitting a scheduling grant on PDCCH for transmission on PUSCH or a scheduling assignment on PDCCH for transmission on PDSCH, to be valid in the subframe, among the subframes within a duration of T subframes, having the lowest SPS transmission load.

According to another aspect of the present invention, there is provided a base station that is configured to balance transmission within Semi-Persistent Scheduling, SPS, comprising an SPS activator that is configured to decide whether to activate SPS transmission or not, and an SPS load tracker that is configured to determine the SPS transmission load a Physical Shared Channel or to determine the number of HARQ ACK/

NACJ responses to SPS transmission load on a Physical Shared Channel, on a Physical Control Channel. Also the base station comprises a scheduler, operatively connected to the SPS activator and the SPS load tracker, and configured to schedule transmission on Physical Downlink Shared CHannel, PDSCH, or on Physical Uplink Shared Channel, PUSCH, so that the SPS transmission on the Physical Shared Channel is performed in the subframe having the lowest SPS transmission load on the Physical Shared Channel or so that the HARQ ACK/NACK response to the SPS transmission on the Physical Shared Channel is performed in the subframe having the lowest load on the Physical Control Channel.

The SPS activation unit may further be configured to decide whether to activate downlink or uplink SPS transmission, based on at least one of: a send buffer of the base station, a scheduling request from the UE, a packet from the UE as received by the base station, and a send buffer report from the UE.

The SPS activation unit may further be configured to decide whether to activate SPS downlink or uplink transmission, based on an estimated number of required Control Channel Elements, CCE for retransmissions and total Physical Uplink Control Channel, PUCCH output power.

Among the advantages with some embodiments of the present invention may be mentioned:

- Less postponing of dynamic scheduling of delay-critical data to later subframes due to a lot of PDSCH or PUSCH resources being occupied by SPS transmissions in some subframes,
- Less subframes where PDCCH resources are unused due to a lot of PDSCH or PUSCH resources being occupied by SPS transmissions in some subframes,
- Less collisions between synchronous HARQ retransmissions and SPS transmissions in uplink and less grant signaling to resolve these collisions,
- Less interference variations in time,
- Less postponing of dynamic scheduling of delay critical data in downlink to later subframes due to a lot of PUCCH resource being occupied by SPS transmissions or alternatively a lower PUCCH load or a lower PUCCH overhead,
- Less postponing of dynamic scheduling of delay critical data in uplink to later subframes due to a lot of PHICH resources being occupied by SPS transmissions or alternatively lower PHICH overhead, and
- Less subframes where PDCCH resources are unused due to a lot of PUCCH or PHICH resources being occupied by SPS transmissions in some subframes The advantages of some further embodiments comprise the combination of advantages of some other embodiments of the present invention.

It should be emphasized that the term "comprises/comprising" when being used in the specification is taken to specify the presence of the stated features, steps or components but does not preclude the presence or addition of one or more other features, steps or components or groups thereof.

BRIEF DESCRIPTION OF DRAWINGS

In order to explain advantages and features of the present invention herein in more detail a few embodiments will be described below, where references are made to the accompanying drawings, for which

FIGS. 3A and 3B, illustrate channel load as a function of time, in line with embodiments of the present invention, FIGS. 4A, 4B, 5 and 6, all illustrate a flow-chart of method steps according to various embodiments of the present invention, and FIG. 7 schematically illustrates a base station according to some embodiments of the present invention.

| ABBREVIATIONS | |
|---|---|
| C-RNTI | Cell Radio Network Temporary Identifier |
| HARQ | Hybrid Automatic Repeat reQuest |
| LTE | Long Term Evolution |
| PDCCH | Physical Downlink Control CHannel |
| PUCCH | Physical Uplink Control CHannel |
| PDSCH | Physical Downlink Shared CHannel |
| PUSCH | Physical Uplink Shared CHannel |
| PHICH | Physical Harq Indicator CHannel |
| RRC | Radio Resource Control |
| SPS | Semi-Persistent Scheduling |
| UE | User Equipment |

DETAILED DESCRIPTION

An inventive idea of the embodiments of the present invention comprises the determining a subframe in which Semi-Persistent Scheduling (SPS) is activated in such a way that the SPS load, in terms of UEs having SPS transmission and/or in terms of Physical Shared Channel resources occupied by SPS transmissions, is spread over time. By spreading the transmitted SPS load over time, a balanced load can be achieved circumventing delays, retransmissions etc that may be the result of a too heavily loaded channel resource.

The present invention will now be described with reference to a few figures illustrating the different embodiments thereof, of a telecommunication system.

Figure 1:
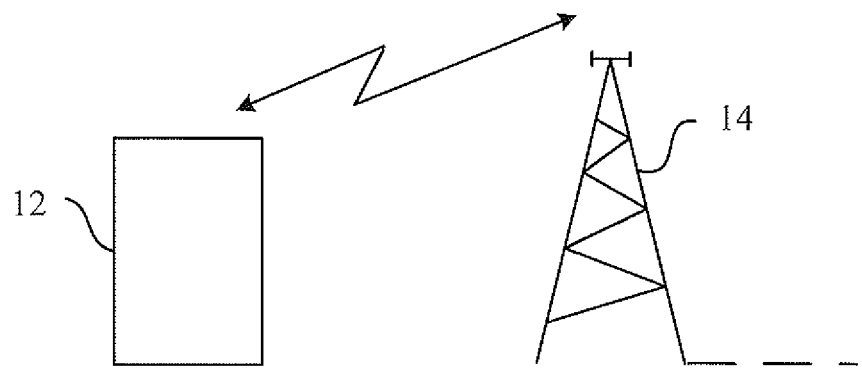
FIG. 1 illustrates a telecommunication network comprising a User Equipment, UE and a base station.

FIG. 1 illustrates a UE 12 in communication with a base station 14 of such a telecommunication system.

The embodiments of the present invention reside mainly in the base station 14, which may be a NodeB or an eNodeB.

Figure 2:
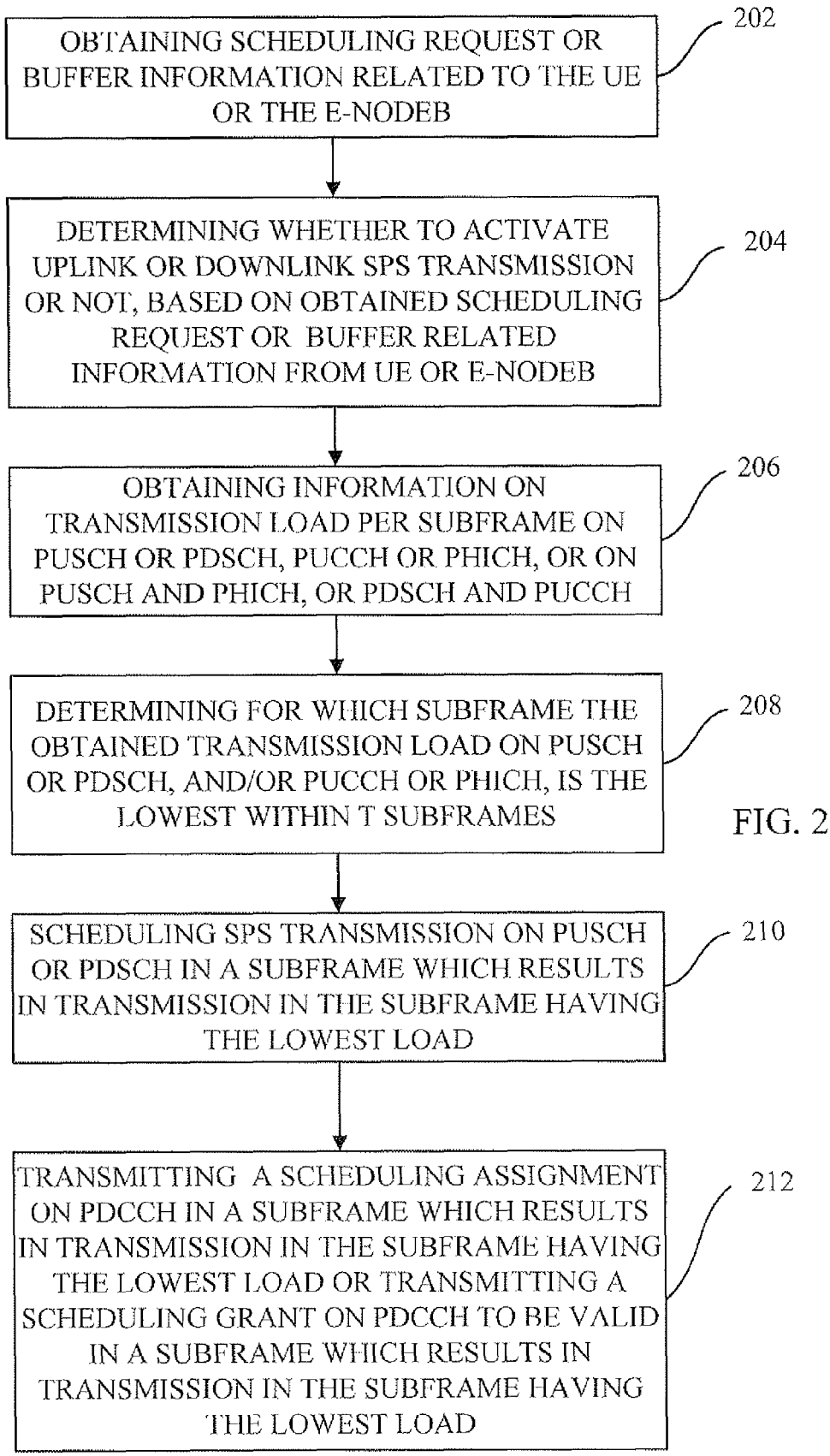
FIG. 2 illustrates a flow chart of a general method for load balancing, according to various embodiments of the present invention.

FIG. 2 serves to illustrate a flow chart of method steps according to a generalized embodiment. This generalized method will later be associated to specific embodiments of the present invention.

The generalized method steps may start with step 202 of obtaining information initiating a Semi Persistent Scheduling (SPS) transmission. This information may comprise a scheduling request from a User Equipment (UE), information on the UE send buffer or information on the base station send buffer. SPS transmission may in this way be initiated by either the UE or by the base station, by the scheduling request or the UE send buffer of the UE, or by the base station by send buffer of the base station.

The next step may be determining whether to activate uplink or downlink SPS transmission in step 204, based either on the obtained scheduling request or on a received package from the UE. It can alternatively be based on the base station send buffer or on a buffer report as received from the UE.

Based on the thus obtained information it can be decided whether to activate uplink or downlink SPS transmission in step 204.

In order to perform a scheduling based on the SPS transmission load, information on the SPS transmission load per subframe on Physical Uplink Shares Channel (PUSCH) or on Physical Downlink Shared Channel (PDSCH) may be obtained in step 206.

According to an alternative, the base station can obtain information on the transmission load on Physical Uplink Control Channel (PUCCH) or on Physical Harq Indicator Channel (PHICH) originating from SPS transmissions.

According to yet another alternative the base station can obtain transmission load on PUSCH and PHICH, or on PDSCH and PUCCH.

Based on the obtained information on transmission load, it can now be determined for which subframe the load on one or more physical channels is the lowest or at least low in step 208 according to certain criteria, as will be described further down.

Within this step it can be determined which subframe has a low SPS transmission load on PUSCH or PDSCH, PUCCH or PHICH, PUSCH and PHICH, or PDCSH and PUCCH, within the duration of T subframes.

The parameter T can be either static or configurable. The parameter T typically depends on the periodicity and delay sensitivity of the service for which SPS is configured. T can adopt any value between 2 and the SPS periodicity. The duration of T subframes may be a duration of 10 ms comprising 10 subframes of 1 ms each.

Having determined on which subframe the SPS transmission is the lowest within the duration of T subframes or at least low according to certain criteria, SPS transmission can be scheduled on PUSCH or PDSCH for the thus determined subframe in step 210, having the lowest or at least low load, and thereby achieving the inventive balancing of SPS transmission load.

Having scheduled an SPS transmission, it can then be transmitted a scheduling assignment on Physical Downlink Control Channel (PDCCH) in the subframe having the lowest or at least low load according to said criteria, in step 212.

Alternatively, an uplink scheduling grant can be transmitted on PDCCH in a subframe such that it is valid in the subframe having low load. For example for Frequency Division Duplexing (FDD) this means that the uplink scheduling grant can be transmitted four subframes prior to the subframe having the low or lowest load. In FDD there is a delay of four subframes from sending a scheduling grant from a base station until the UE can utilize the subframe for Uplink SPS transmission.

With reference to FIGS. 3A and 3B the load for a Physical Control Channel and a Physical Shared Channel, respectively, will now be illustrated. The load as presented in FIG. 3A can be related to the number of UEs. For instance, the SPS HARQ feedback as sent on PUCCH can be directly related to the number of downlink SPS UE.

The load in FIG. 3A can for this reason be presented with unity heights, where each height represents one UE. It should be mentioned that the width of each presented square per subframe represents a duration of one subframe of 1 ms along the time axis.

FIG. 3B illustrates the load from SPS transmission or resource allocation on a Physical Shared Channel such as PUSCH or PDCSH.

Considering the load per subframe in FIGS. 3A and 3B, it can be seen that there are two subframes denoted by 302 and 304, respectively without any load on the studied channels. There is therefore neither an indication in FIG. 3A indicating the number of UE that are scheduled for this subframe, nor an indication in 3B showing the presently scheduled load on Physical Uplink Shared Channel (PUSCH) or on Physical Downlink Shared Channel (PDCSH).

It can be seen that the majority of the subframes however are scheduled by one or more UEs, as indicated in FIG. 3A, as exemplified for instance by the duration of six subframes wherein each subframe has a single scheduled UE.

As the SPS name indicates the scheduling has a periodical part. The SPS period is configurable in length and can have a length of 10 ms spanning 10 consecutive subframes, as indicated by the period 308 in FIG. 3B.

When a base station obtains information initiating a SPS transmission, as described in step 202, the base station can receive a scheduling request from the UE, receive a send buffer report, receive a packet from the UE, or as an alternative obtain information on the send buffer inside the base station.

In FIG. 3B this time instance is denoted by 310, whereas in FIG. 3A it is denoted by 312. Based on the information as obtained or received, it is decided whether to schedule SPS transmission on PUSCH or on PDSCH. Within FIGS. 3A and 3B, the downlink SPS transmission case is considered in the following. It can be noted that scheduling of uplink SPS transmission can be performed in a way similar to the one for downlink SPS transmission, but with consideration of a certain time shift between when the uplink SPS scheduling grant is sent on PDCCH and when the SPS transmission is in fact performed on PUSCH.

At time instance 310 and 312, in FIGS. 3B and 3A, respectively, the downlink SPS transmission is thus initiated. A base station can then determine which subframe has the lowest load on PDSCH or on PUCCH for downlink SPS transmission. The subframe as denoted by 314 in FIG. 3B and by 316 in FIG. 3A, corresponds to the unloaded subframe 304 of the preceding SPS period. This subframe is determined as it is the first subframe having the lowest load after the SPS initiation at subframe 310. Since subframe 316 now has one UE it is illustrated in FIG. 3A as a single square. In FIG. 3B the load can adopt one of a plurality of possible load values. The load in FIG. 3A may in this case of scheduling of downlink SPS transmission, be the load on PUCCH which results from SPS transmission in this frame. The corresponding load in FIG. 3B is thus the load on PDSCH.

In the following a few embodiments will be explicitly pointed out, while making reference to FIG. 2 illustrating the flow chart of a general method steps.

It should be pointed out that the steps that the various embodiments have in common are only briefly discussed below.

Figure 4A:
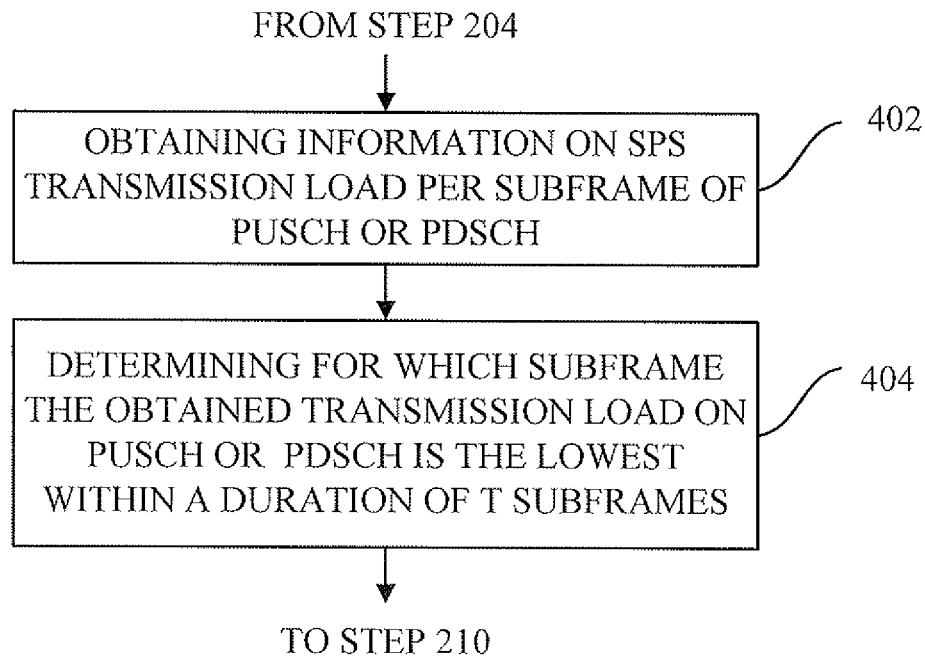

According to some embodiments of the present invention, the first two steps of the method to load balance within SPS transmission, are steps 202 and 204 as presented in FIG. 2. The next step can however be step 402 as illustrated in FIG. 4A, obtaining information on SPS transmission load per subframe on the Physical Uplink Shared Channel (PUSCH) or on the Physical Downlink Shared Channel (PDSCH). In this step the load on Physical Shared Channel can thus be considered alone.

In the next step of step 404 it can be determined for which subframe the obtained SPS transmission load on PUSCH or PDSCH is the lowest within a duration of T subframes, where T is configurable. Within the duration of for example 10 ms it can thus be determined which subframe has the lowest load on PUCSH or PDSCH.

If the activation of SPS transmission refers to downlink SPS transmission, the load on PDCSH is considered since this can be a limiting factor for scheduling a new UE in a subframe, when balancing the load.

Likewise, if the activation of SPS transmission refers to uplink SPS transmission, the load on PUSCH is considered for analogue reasons.

The step of scheduling SPS transmission is then performed following step 210, by either scheduling SPS transmission on PUSCH or PDCSH to be valid in the subframe having the lowest transmission load.

A downlink scheduling assignment can then be transmitted on Physical Downlink Control Channel (PDCCH) in the subframe having the lowest SPS transmission load on PDSCH, in line with step 212. Alternatively, an uplink scheduling grant can be transmitted on PDCCH in a subframe such that it is valid in the subframe having the low or lowest SPS transmission load on PUSCH, also in line with step 212.

When a base station has identified that a reason to activate downlink or uplink SPS for a UE it considers how many PDSCH or PUSCH resources that are occupied for SPS transmissions in a window of T subframes starting from the subframe it is sending grants/assignments for. The base station can then select to transmit the grant or assignment at a time so that it becomes valid in the subframe in which the least amount of resources is occupied for SPS transmissions. Within these embodiments of the present invention, the PDSCH or PUSCH resources for SPS transmission are spread over time, since the load on PDSCH or PUSCH is balanced over time.

Figure 4B:
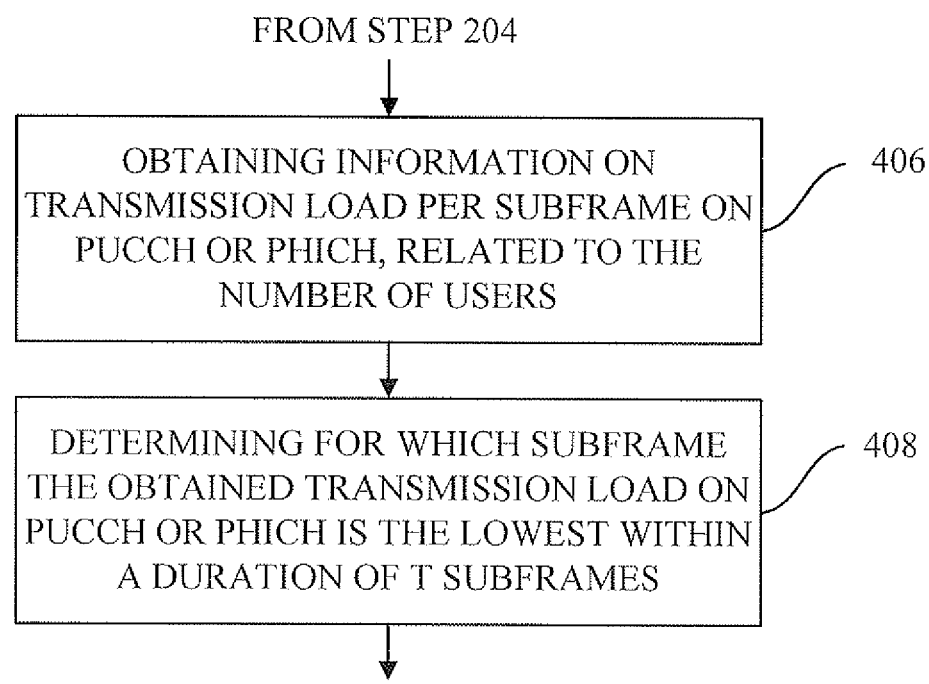

According to some further embodiments of the present invention the first two steps of the method for load balancing within SPS transmission, can again be steps 202 and 204 as presented in FIG. 2. The following step may however be step 406 as illustrated in FIG. 4B, obtaining information on transmission load per subframe on the Physical Uplink Control Channel (PUCCH) or on the Physical Harq Indicator Channel (PHICH). This load is a result from SPS transmissions on a Physical Shared Channel. In this present step the load on Physical Control Channels can thus be considered alone.

The following step can be step 408 in which it is determined for which subframe the obtained transmission load on PUCCH or PHICH is the lowest within a duration of T subframes. Within this duration it is then determined which subframe has the lowest load on PUCCH or PHICH.

In the case the activation of SPS transmission refers to downlink SPS transmission, the load on PUCCH is considered. One of the reasons to study the load on this channel is that the UE sends a HARQ ACK/NACK to the base station on this channel following a downlink SPS transmission.

In the case the activation of SPS transmission refers to uplink SPS transmission, the load on PHICH is considered, one reason being that the base station sends a HARQ response in the form of an ACK/NACK response on PHICH to the UE, following uplink SPS transmission.

The next step is then step 210, scheduling SPS transmission on PDSCH or PUCSH in a subframe that is selected such that the HARQ ACK/NACK response on PUCCH or PHICH, respectively, will be transmitted in the subframe having the lowest transmission load on PUCCH or PHICH, respectively.

A downlink scheduling assignment can thereafter be transmitted on Physical Downlink Control Channel (PDCCH) in a subframe which results in HARQ ACK/NACK response on PUCCH in the subframe having the lowest transmission load on PUCCH, in line with step 212. Alternatively, an uplink scheduling grant can be transmitted on PDCCH in a subframe which results in HARQ ACK/NACK response on PHICH in the subframe having the lowest transmission load on PHICH, in line with step 212.

Within said further embodiments of the present invention that have been described above, the load on channels is related to the number of UEs that have transmissions in a window of T subframes starting from the subframe a grant/assignment is sent on. The scheduling grant or scheduling assignment can then be transmitted in time so that it is valid in the subframe with the lowest load, which may correspond to the subframe having the smallest number of UEs with SPS transmissions. In this embodiment, the UEs with SPS transmissions are spread over time.

According to some other embodiments of the present invention, steps 202 and 204 remain the same as for the earlier described embodiments. Steps 206 and 208 of obtaining information and determining on which subframe the load is the lowest, within a time duration of T subframes, are replaced by steps 502 to 514 as illustrated in the flow chart of method steps in FIG. 5.

It can be mentioned that the T parameter, may be in the range from 2 up to the SPS periodicity. T can thus be configured to any value of the following: 2, 3, 4, 5, 6, 7, 8, 9 and 10.

Figure 5:
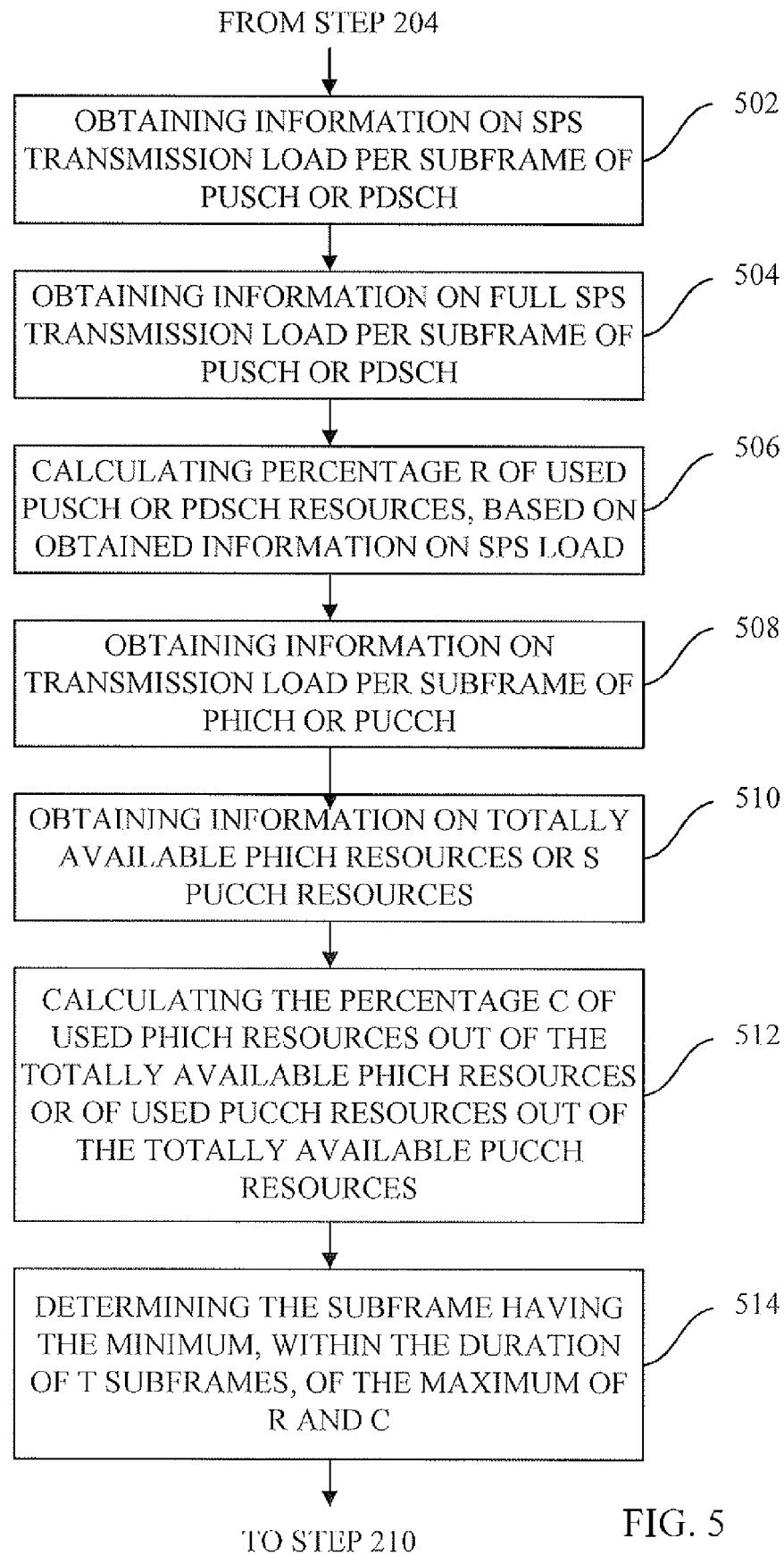

The method steps in FIG. 5 can be considered to be a combination of the method steps as presented in FIGS. 4A and 4B. In FIG. 4A the base station obtains information on the load on Physical Shared Channels and in FIG. 4B the base station can obtain information on the load on Physical Control Channels.

In step 502, the base station can obtain information on SPS transmission load per subframe of PUSCH or PDSCH. In step 504 the base station can obtain information on full SPS transmission load, i.e. the SPS transmission capacity per subframe of PUSCH or PDSCH. Again, if the activation of SPS transmission refers to uplink SPS transmission the SPS transmission load on PUSCH is considered, and conversely in case it refers to downlink SPS transmission, the SPS transmission load on PDSCH is considered.

In the next step, step 506, it can be calculated a percentage R of used PUSCH or PDSCH resources, based on the obtained SPS transmission load. By calculating the quota of an actual SPS transmission load and the full SPS transmission load, the amount of used resources can be expressed as a percentage of the full capacity.

Thereafter, information on the transmission load, per subframe of PUCCH or on PHICH, as a result from SPS transmission on PDSCH or on PUSCH, can be obtained in step 508. In step 510, information on the totally available PHICH resources or the S amount of PUCCH resources can be obtained. Based on the information from step 508 and 510, a percentage C of used PHICH resources out of the totally available PHICH resources can be calculated, in step 512. Alternatively, the percentage C of used PUCCH resources out of the totally available S amount of PUCCH resources, can be calculated.

It is thus determined one quota each for SPS transmission load on a Physical Shared Channel and on a Physical Control Channel.

Now, it can be determined a subframe that has the minimum, within the duration of T subframes, of the maximum of R and C, in step 514. For each subframe, the maximum of R and C is chosen, where after the T load values are compared. The subframe having the lowest of these T vales within the duration of T ms is then selected as the subframe, at which SPS transmission can be scheduled in order to achieve the inventive load balancing according to some embodiments of the present invention.

According to yet some other embodiments of the present invention, steps 202 and 204 remain the same as for the earlier described embodiments, and as presented in FIG. 2. Steps 206 and 208 of obtaining information and determining on which subframe the load is the lowest, within a time duration of T subframes, are however now replaced by steps 602 to 612 as schematically illustrated in the flow chart of method steps in FIG. 6. It will be soon be realized that the embodiments of the present invention as presented in FIG. 6 may be considered to be a combination of embodiments as presented in FIGS. 4A and 4B. As described above, in FIG. 4A information on the load on a Physical Shared Channel is obtained and in FIG. 4B information on the load on a Physical Control Channel is obtained.

Figure 6:
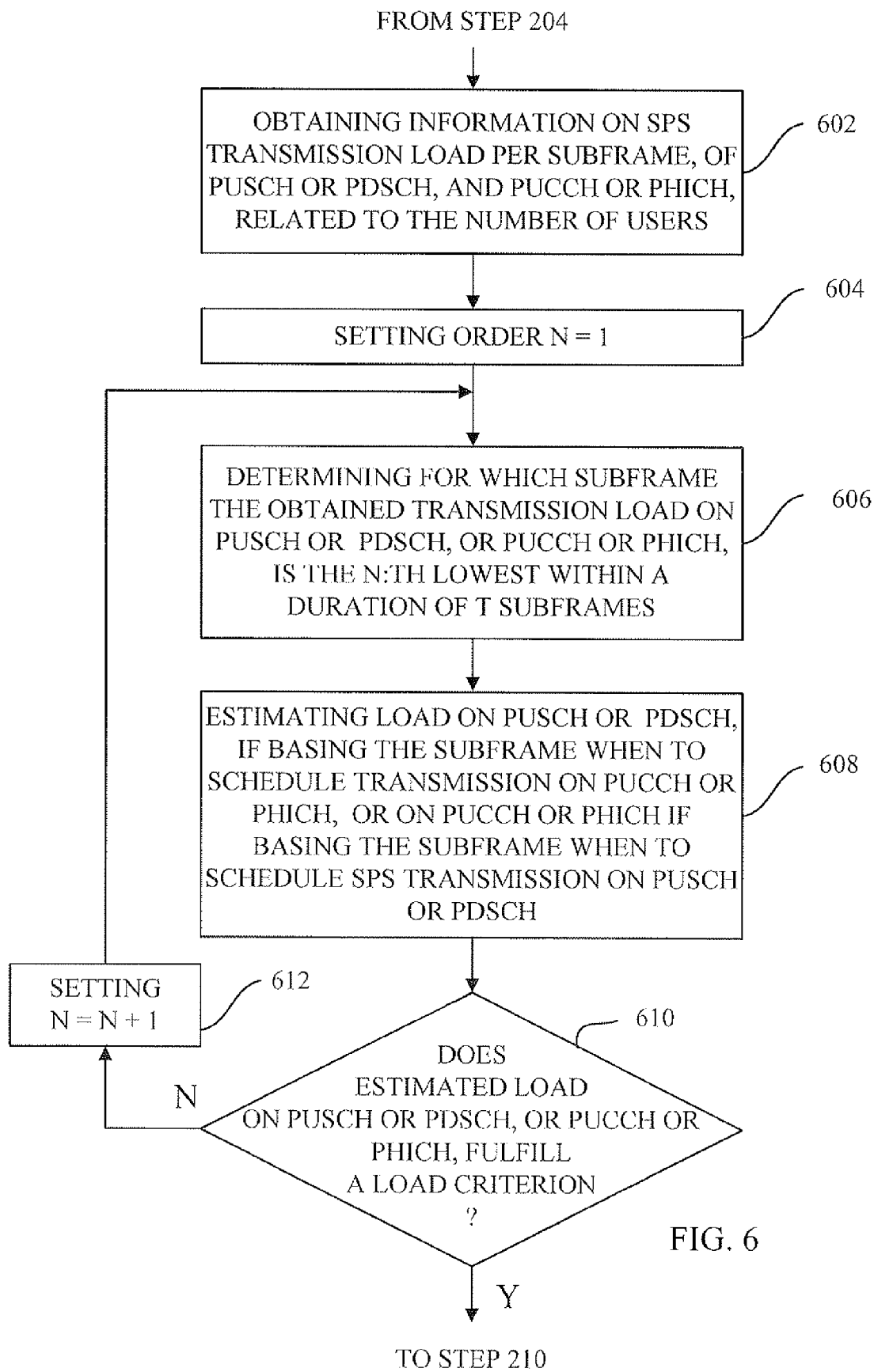

Following steps 202 and 204 as illustrated in FIG. 2, FIG. 6 presents step 602 that to a large extent may remind on step 206. In step 602 information on SPS transmission load per subframe on PUSCH or PDSCH can be obtained, and information on transmission load on PUCCH or PHICH, wherein the load on PHICH and PUCCH relate to the number of UE being scheduled for SPS transmission.

The next step may be to set an initial order N to one (1), in step 604. The following step can be determining for which subframe the obtained transmission load on PUSCH or PDSCH, or PHICH or PUCCH, is the N:th lowest within the duration of T subframes in step 606. Since N is one, it is determined for which subframe the load is the lowest on one of these channels. In case of activation of uplink SPS transmission the load on PUSCH or PHICH is considered, and in case of activation of downlink SPS transmission, the load on PDSCH or PUCCH is considered. Based on whether it is more important to spread the UEs over time or to spread the SPS transmission on PDSCH or PUSCH over time, either the shared channel or the control channel load can be considered.

In step 608, the resulting load on the corresponding shared channel is then estimated in the case the load on a control channel was considered in step 606. Alternatively, the resulting load on the corresponding control channel is estimated in the case the load on the shared channel was considered in step 606. In more detail, for activation of uplink SPS transmission, the load on PUSCH is estimated for scheduling SPS transmission in a subframe which results in HARQ ACK/NACK response in the subframe having the N:th lowest load on PHICH, or the load on PHICH is estimated for scheduling SPS transmission to be valid in the subframe having the N:th lowest load on PUSCH. It is thus estimated the load on PUSCH if scheduling SPS transmission on a subframe which results in HARQ ACK/NACK response in the subframe having the lowest load on PHICH, or it is estimated the load on PHICH if scheduling SPS transmission to be valid in the subframe having the lowest load on PUSCH. Likewise for activation of downlink SPS transmission, the load on PDSCH is estimated for scheduling SPS transmission on a subframe which results in HARQ ACK/NACK response in the subframe having the N:th lowest load on PUCCH, or the load on PUCCH is estimated for scheduling SPS transmission in the subframe having the N:th lowest load on PDSCH. It is thus estimated the load on PDSCH if scheduling SPS transmissions in a subframe which results in HARQ ACK/NACK response in the subframe having the lowest load on PUCCH, or it is estimated the load on PUCCH if scheduling SPS transmission on the subframe having the lowest load on PDSCH.

In the following step, step 610 it is then determined whether the estimated load on PDCSH or PUSCH, or PUCCH or PHICH fulfills a load criterion or not. One example of the load criterion may be that there should be at least one subframe with a larger number of used PHICH or PUCCH resources than the subframe having the lowest load. Another example of such a load criterion may comprise that there should be at least one subframe with a larger number of used PDSCH or PUSCH resources. The load criterion may comprise a measure to prevent scheduling SPS transmission on a subframe if the consequence is that the load on another channel related to SPS transmission is the highest within the duration of T.

If the load criterion in step 610 is not fulfilled, the following step may be step 612 of incrementing the order N by setting N=N+1.

In the following step, it is now determined a subframe on which the obtained transmission load on PUSCH or PDCSH, or PHICH or PUCCH is the N:th lowest within the duration of T consecutive subframes, in a novel step 606. Since N is two, it is determined on which subframe the load on PUSCH or PDSCH, or PHICH or PUCCH is the second lowest within the SPS period of T subframes.

According to an alternative embodiment, it can be determined on which subframe a certain load is the lowest within the duration of T subframes, while the resulting load on one or two Physical Shared Channels and the load on one or two Physical Control Channels related to the base station is below a load threshold value. It can thus be determined a subframe in which a certain load is the lowest while the resulting load on remaining physical shared or control channels, does not exceed a certain threshold value, enabling load balancing within SPS.

Following step 606 it is estimated the resulting load in novel step 608 on the corresponding control channel in case the load on a shared channel was considered in the novel step 606. Alternatively, the resulting load is estimated on the corresponding shared channel in novel step 608 in case the load on a control channel was considered in the novel step 606, i.e. in case the subframe when to schedule SPS transmission is based on the load on PHICH or PUCCH.

In novel step 610 it is determined whether the estimated load on PUSCH or PDCSH, or PHICH or PUCCH fulfills a load criterion, or not. The subframe as determined in novel step 606 is often different from the subframe as determined in former step 606. For this reason the determination as to whether the load criterion is fulfilled or not in former step 610 as compared to novel step 610 refers to different subframes.

In the event that the load criterion in novel step 610 is not fulfilled, the following step is thus another incrementation of the order N, by setting N=3, followed by another turn of steps 606-610.

If the load criterion in novel step 610 however is fulfilled, the following step is step 210 of scheduling SPS transmission on PUSCH or PDSCH, as described in connection to FIG. 2 above. A downlink scheduling assignment or an uplink scheduling grant is then transmitted on PDCCH according to step 212, as earlier described.

According to an alternative embodiment, the load balancing can also be based on other resources such as an estimate of the required number of Control Channel Elements (CCEs) for retransmissions and the total PUCCH output power.

Figure 7:
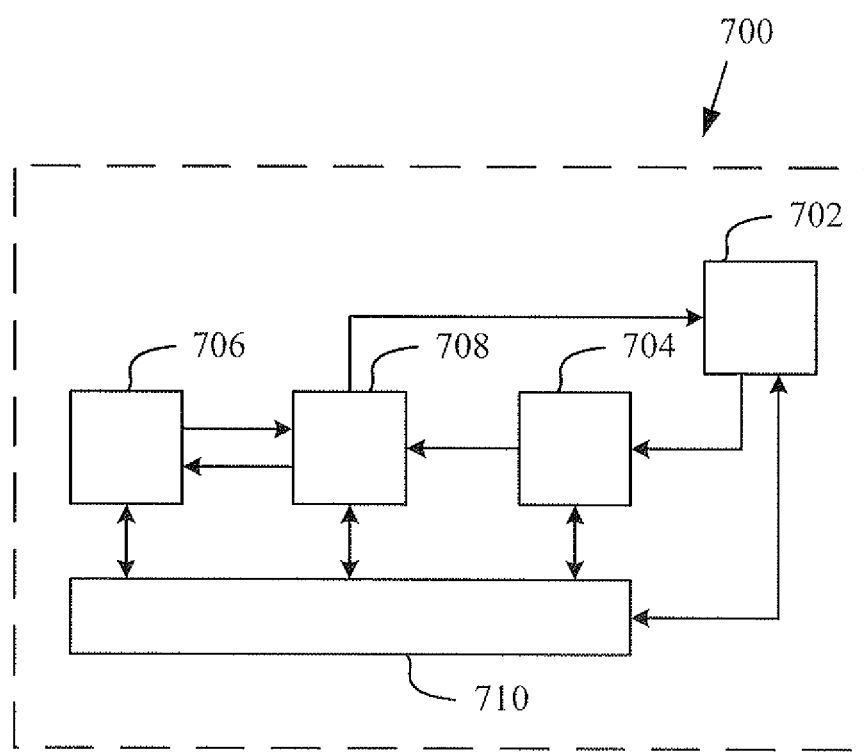

Reference will now be given to FIG. 7 that schematically illustrates a base station 700 configured to balance transmission within Semi-Persistent Scheduling, SPS. This base station 700 comprises a transceiver 702, an SPS activator 704, an SPS scheduler 706 and a load tracker 708, according to some embodiments of the present invention. The base station 700 may also comprise a control unit 710 configured to control the units comprised within the base station 700. The transceiver 702 may be configured to receive a scheduling request from a UE, to receive a send buffer report from the UE or to receive a packet from the UE. The SPS activator 704 can be configured to decide whether to activate uplink or downlink SPS transmission, based on said receive information from the UE or alternatively based on a base station send buffer.

The load tracker 706 may be configured to determine the transmission load on PUSCH or PDSCH, or on PUCCH or PHICH, or on PUSCH and PHICH, or PDSCH and PUCCH.

The scheduler 708 can be operatively connected to the SPS activator 704 and to the SPS load tracker 706. The scheduler can further be configured to schedule transmission on PUSCH or PDSCH, to be valid in the subframe which results in a transmission in a subframe on a Physical Shared Channel or a Physical Control Channel having the lowest transmission load.

It must be emphasized that the present invention can be varied in many ways. The presented embodiments of the present invention are only a few examples of the variety of embodiments that are comprised within the present invention.

The embodiments of the present invention provide at least some of the multitude of advantages of which some are:

- Less postponing of dynamic scheduling of delay critical data to later subframes due to a lot of PDSCH or PUSCH resources being occupied by SPS transmissions in some subframes,
- Less subframes where PDCCH resources are unused due to a lot of PDSCH or PUSCH resources being occupied by SPS transmissions in some subframes,
- Less collisions between synchronous HARQ retransmissions and SPS transmissions in uplink and less grant signaling to resolve these collisions,
- Less interference variations in time,
- Less postponing of dynamic scheduling of delay critical data in downlink to later subframes due to a lot of PUCCH resource being occupied by SPS transmissions or alternatively a lower PUCCH load or a lower PUCCH overhead,
- Less postponing of dynamic scheduling of delay critical data in uplink to later subframes due to a lot of PHICH resources being occupied by SPS transmissions or alternatively lower PHICH overhead, and
- Less subframes where PDCCH resources are unused due to a lot of PUCCH or PHICH resources being occupied by SPS transmissions in some subframes.

Some embodiments may have combinations of advantages from other embodiments.

The invention claimed is:

1. A method in a base station for load balancing within Semi-Persistent Scheduling (SPS) comprising:
   activating downlink or uplink SPS transmission for a User Equipment (UE), for a subframe;
   obtaining information about SPS transmission load on a Physical Shared Channel or transmission load related to SPS transmissions on a Physical Shared Channel, on a Physical Control Channel;
   determining for which subsequent subframe within a duration of T subframes, the SPS transmission load on the Physical Shared Channel or the transmission load related to Physical Shared Channel SPS transmissions, on the Physical Control Channel, is the lowest among the subframes within the duration of T subframes; and
   scheduling SPS transmission on a Physical Shared Channel to be valid in the determined subframe having the lowest SPS transmission load in the case the SPS transmission load on the Physical Shared Channel is the lowest among the subframes within the duration of T subframes, or scheduling SPS transmission on a Physical Shared Channel to be valid in a subframe determined such that a Hybrid Automatic Repeat reQuest (HARQ) ACK/NACK response to SPS transmission on the Physical Shared Channel is transmitted on the Physical Control Channel in the determined subframe, within the duration of T subframes.

2. The method according to claim 1, wherein the step of obtaining information, comprises obtaining the amount of resources occupied for SPS transmission on a Physical Uplink Shared Channel (PUSCH) or on a Physical Downlink Shared Channel (PDSCH).

3. The method according to claim 2, wherein the step of determining comprises determining for which subsequent subframe within a duration of T subframes, the SPS transmission load on the PUSCH or on the PDSCH is the lowest among the subframes within the duration on T subframes, and wherein the step of scheduling transmissions comprises scheduling transmissions on the PUSCH or on the PDSCH to be valid in the determined subframe having the lowest SPS transmission load, among the subframes within the duration of T subframes.

4. The method according to claim 2, wherein the step of obtaining information further comprises obtaining the number of UEs with SPS transmission on the Physical Shared Channel.

5. The method according to claim 4, wherein the step of determining further comprises determining a percentage R of used PDSCH or PUSCH resources out of a totally available PDSCH or PUSCH resources for each subframe within a duration of T subframes, and a percentage C of used Physical HARQ Indicator Channel (PHICH) resources out of a totally available PHICH resources, or the percentage of used Physical Uplink Control Channel (PUCCH) resources out of a number of supported PUCCH resources, and determining for which subframe the maximum of R and C per subframe has a minimum among the subframes within the duration of T subframes.

6. The method according to claim 5, wherein the step of scheduling transmission further comprises scheduling SPS transmission on the PDSCH or PUSCH to be valid in the determined subframe, having the minimum among the subframes within a duration of T subframes, of the maximum of R and C per subframe.

7. The method according to claim 4, wherein the step of determining further comprises determining the subframe, having the lowest number of UEs with SPS transmission or the lowest number of used PDSCH or PUSCH resources, among the subframes within a duration of T subframes, further comprises determining whether the number of UEs with SPS transmission is below an upper limit of number of UEs, in case the subframe having the lowest number of used PDSCH or PUSCH resources, among the subframes within a duration of T subframes, is used, or determining whether the number of used PDSCH or PUCSH resources is below an upper limit of PDCSH or PUSCH resources, in case the subframe having the lowest number of UEs, among the subframes within a duration of T subframes, is used, according to one or more criterion.

8. The method according to claim 7, wherein the step of determining further comprises determining a subsequent subframe among the subframes within a duration of T subframes, having the second lowest number of UEs with SPS transmission or the second lowest number of used PDSCH or PUSCH resources for SPS transmission, in the case the determined number of UEs with SPS transmission is above an upper limit of UEs with SPS transmission when the subframe having the lowest number of used PDSCH or PUSCH resources, among the subframes within a duration of T subframes, is used, or in case the number of used PDSCH or PUSCH resources is above the upper limit of used PDSCH or PUCSH resources, when the subframe having the lowest number of UEs with SPS transmission, among the subframes within a duration of T subframes, is used, and further comprising determining whether the number of UEs with SPS transmission is below an upper limit of number of UEs, in case the subframe having the second lowest number of used PDSCH or PUSCH resources, among the subframes within a duration of T subframes, is used, or determining whether the number of used PDSCH or PUCSH resources is below an upper limit of PDSCH or PUSCH resources, in case the subframe having the second lowest number of UEs, among the subframes within a duration of T subframes, is used.

9. The method according to claim 8, wherein the step of scheduling transmission comprises scheduling transmission on the PDSCH or PUSCH to be valid in the subframe having the second lowest transmission load, among the subframes within the duration of T subframes.

10. The method according to claim 1, wherein the step of obtaining information comprises obtaining the number of UEs with SPS transmissions on a Physical Shared Channel.

11. The method according to claim 10, wherein the step of obtaining information, comprises obtaining the number of resources on a Physical HARQ Indicator Channel (PHICH) or on a Physical Uplink Control Channel (PUCCH) occupied for HARQ ACK/NACK responses to SPS transmissions on a Physical Shared Channel.

12. The method according to claim 11, wherein the step of determining comprises determining for which subsequent subframe within a duration of T subframes, the HARQ ACK/NACK response to SPS transmission load on a Physical Shared Channel, on the PHICH or PUCCH is the lowest among the subframes within the duration on T subframes, and wherein the step of scheduling transmissions comprises scheduling transmissions on a Physical Uplink Shared Channel (PUSCH) or on a Physical Downlink Shared Channel (PDSCH) to be valid in a subframe that makes the HARQ ACK/NACK response to the SPS transmission on the Physical Shared Channel, to be transmitted on the PHICH or PUCCH in the subframe having the lowest transmission load on the PHICH or PUCCH, respectively, among the subframes within the duration of T subframes.

13. The method according to claim 1, further comprising transmitting a scheduling grant on a Physical Downlink Control Channel (PDCCH), for transmission on a Physical Uplink Shared Channel (PUSCH) or a scheduling assignment on the PDCCH for transmission on a Physical Downlink Shared Channel (PDSCH), to be valid in the subframe, among the subframes within a duration of T subframes, having the lowest SPS transmission load.

14. A base station configured to balance transmission within Semi-Persistent Scheduling (SPS) comprising:
 an SPS activator configured to decide whether to activate downlink or uplink SPS transmission;
 an SPS load tracker configured to determine SPS transmission load on a Physical Shared Channel or to determine the number of Hybrid Automatic Repeat request HARQ ACK/NACK responses to SPS transmission load on a Physical Shared Channel, on a Physical Control Channel;
 a scheduler operatively connected to the SPS activator and the SPS load tracker and configured to schedule SPS transmission on a Physical Downlink Shared CHannel (PDSCH) or on a Physical Uplink Shared Channel (PUSCH) so that the SPS transmission on the Physical Shared Channel is performed in the subframe having the lowest SPS transmission load on the Physical Shared Channel or so that the HARQ ACK/NACK response to the SPS transmission on the Physical Shared Channel is performed in the subframe having the lowest load on the Physical Control Channel.

15. The base station according to claim 14, wherein the SPS activation unit further is configured to decide whether to activate downlink or uplink SPS transmission, based on at least one of: a send buffer of the base station, a scheduling request from the UE, a packet from the UE as received by the base station, and a send buffer report from the UE.

16. The base station according to claim 14, wherein the SPS activation unit further is configured to decide whether to activate SPS downlink or uplink transmission, based on an estimated number of required Control Channel Elements (CCE) for retransmissions and total Physical Uplink Control Channel (PUCCH) output power.

* * * * *

UNITED STATES PATENT AND TRADEMARK OFFICE
CERTIFICATE OF CORRECTION

PATENT NO. : 8,675,492 B2
APPLICATION NO. : 13/575082
DATED : March 18, 2014
INVENTOR(S) : Jersenius et al.

It is certified that error appears in the above-identified patent and that said Letters Patent is hereby corrected as shown below:

In the Specification

Column 3, Line 2, delete "abase" and insert -- a base --, therefor.

Column 4, Line 24, delete "PUCSH" and insert -- PUSCH --, therefor.

Column 4, Line 25, delete "PDCSH" and insert -- PDSCH --, therefor.

Column 4, Line 40, delete "PUCSH" and insert -- PUSCH --, therefor.

Column 4, Line 48, delete "PUCSH" and insert -- PUSCH --, therefor.

Column 5, Line 1, delete "NACJ" and insert -- NACK --, therefor.

Column 7, Line 18, delete "PDCSH" and insert -- PDSCH --, therefor.

Column 7, Line 59, delete "PDCSH." and insert -- PDSCH. --, therefor.

Column 7, Line 67, delete "(PDCSH)." and insert -- (PDSCH). --, therefor.

Column 8, Line 63, delete "PUCSH or PDCSH." and insert -- PUSCH or PDSCH. --, therefor.

Column 8, Line 65, delete "PDCSH" and insert -- PDSCH --, therefor.

Column 9, Line 6, delete "PDCSH" and insert -- PDSCH --, therefor.

Column 9, Line 53, delete "PUCSH" and insert -- PUSCH --, therefor.

Column 11, Line 60, delete "PDCSH" and insert -- PDSCH --, therefor.

Column 12, Line 9, delete "PDCSH," and insert -- PDSCH, --, therefor.

Column 12, Line 34, delete "PDCSH," and insert -- PDSCH, --, therefor.

Signed and Sealed this
Second Day of September, 2014

Michelle K. Lee
*Deputy Director of the United States Patent and Trademark Office*

CERTIFICATE OF CORRECTION (continued)
U.S. Pat. No. 8,675,492 B2

In the Claims

Column 14, Line 51, in Claim 7, delete "PUCSH" and insert -- PUSCH --, therefor.

Column 14, Line 52, in Claim 7, delete "PDCSH" and insert -- PDSCH --, therefor.

Column 14, Line 67, in Claim 8, delete "PUCSH" and insert -- PUSCH --, therefor.

Column 15, Line 9, in Claim 8, delete "PUCSH" and insert -- PUSCH --, therefor.

Column 16, Line 30, in Claim 15, delete "further is" and insert -- is further --, therefor.

Column 16, Line 36, in Claim 16, delete "further is" and insert -- is further --, therefor.